(12) United States Patent
Spadafora

(10) Patent No.: US 6,575,264 B2
(45) Date of Patent: Jun. 10, 2003

(54) PRECISION ELECTRO-HYDRAULIC ACTUATOR POSITIONING SYSTEM

(75) Inventor: William Glenn Spadafora, Clarkston, MI (US)

(73) Assignee: Dana Corporation, Toledo, OH (US)

( * ) Notice: Subject to any disclaimer, the term of this patent is extended or adjusted under 35 U.S.C. 154(b) by 0 days.

(21) Appl. No.: 10/169,634

(22) PCT Filed: Jan. 26, 2001

(86) PCT No.: PCT/US01/02624

§ 371 (c)(1),
(2), (4) Date: Jul. 3, 2002

(87) PCT Pub. No.: WO01/54960

PCT Pub. Date: Aug. 2, 2001

(65) Prior Publication Data

US 2003/0000765 A1 Jan. 2, 2003

Related U.S. Application Data

(63) Continuation-in-part of application No. 09/492,623, filed on Jan. 27, 2000, now Pat. No. 6,298,941.
(60) Provisional application No. 60/117,890, filed on Jan. 29, 1999.

(51) Int. Cl.[7] .............................. B62D 5/04; B62D 5/10
(52) U.S. Cl. ..................... 180/422; 180/417; 60/571; 701/41
(58) Field of Search .................... 180/417, 421, 180/422, 428, 441, 442, 443, 444, 446; 701/41; 417/44.1, 45, 44.11, 18; 60/571, 572, 573, 494

(56) References Cited

U.S. PATENT DOCUMENTS

| | | | |
|---|---|---|---|
| 1,364,872 A | 1/1921 | Feightner | |
| 3,901,343 A | 8/1975 | Inoue | |
| 3,908,779 A | 9/1975 | Inoue | |
| 3,939,938 A | 2/1976 | Inoue | |
| 4,010,815 A | 3/1977 | Strauff | |
| 4,019,616 A | 4/1977 | Thorne | |
| 4,410,059 A | 10/1983 | Nakayama et al. | |
| 4,872,310 A | 10/1989 | Kaye | |
| 5,080,186 A | 1/1992 | Elser et al. | |
| 5,230,396 A | 7/1993 | Yasui | |
| 5,279,380 A | 1/1994 | Frank et al. | |
| 5,313,389 A | 5/1994 | Yasui | |
| 5,373,911 A | 12/1994 | Yasui | |
| 5,445,239 A | 8/1995 | Miller et al. | |
| 5,558,177 A | 9/1996 | Inaguma et al. | |
| 5,655,371 A | 8/1997 | Chuang et al. | |
| 5,704,250 A | 1/1998 | Black | |
| 5,725,023 A | 3/1998 | Padula | |
| 6,298,941 B1 | 10/2001 | Spadafora | |

*Primary Examiner*—Anne Marie Boehler
(74) *Attorney, Agent, or Firm*—Reising, Ethington, Barnes, Kisselle & Learman, P.C.

(57) ABSTRACT

An electro-hydraulic actuator system (10 or 140) includes a hydraulic actuator (27) having a pair of fluid filled chambers (29, 30) and being operable to provide an actuator output (12) as a function of fluid pressures at the chambers. An electric-hydrostatic actuator (34 or 141) includes an electric motor (35 or 142) responsive to motor control signals for providing an output to a motor shaft (40 or 150), one or more pistons (56 or 166, 170) coupled to the shaft, and one or more hydraulic housings (92 or 160, 162) mounted on the motor and cooperating with the pistons for providing a pair of fluid cylinders (54 or 164, 168) respectively coupled to the fluid chambers at the hydraulic actuator. A solenoid valve (33) is connected between the cylinders, and is responsive to valve control signals for feeding fluid between the actuator chambers and thereby short circuiting the hydrostatic actuator cylinders. A pair of pressure sensors (80, 82) are coupled to the actuator chambers for providing respective pressure signals as a function of fluid pressure at the chambers, and a controller (92 or 202) is responsive to the pressure signals for providing the valve and motor control signals.

31 Claims, 7 Drawing Sheets

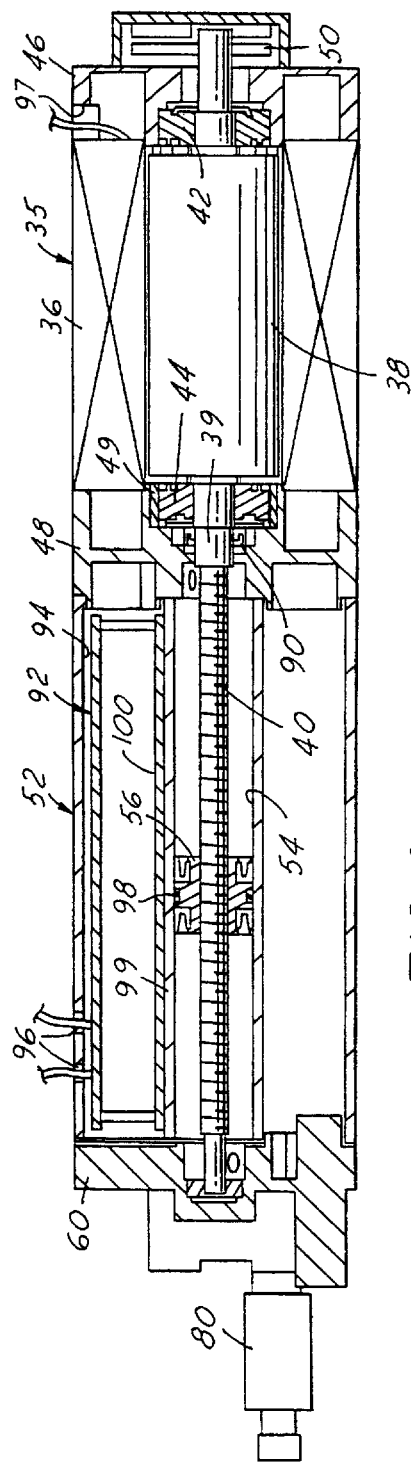
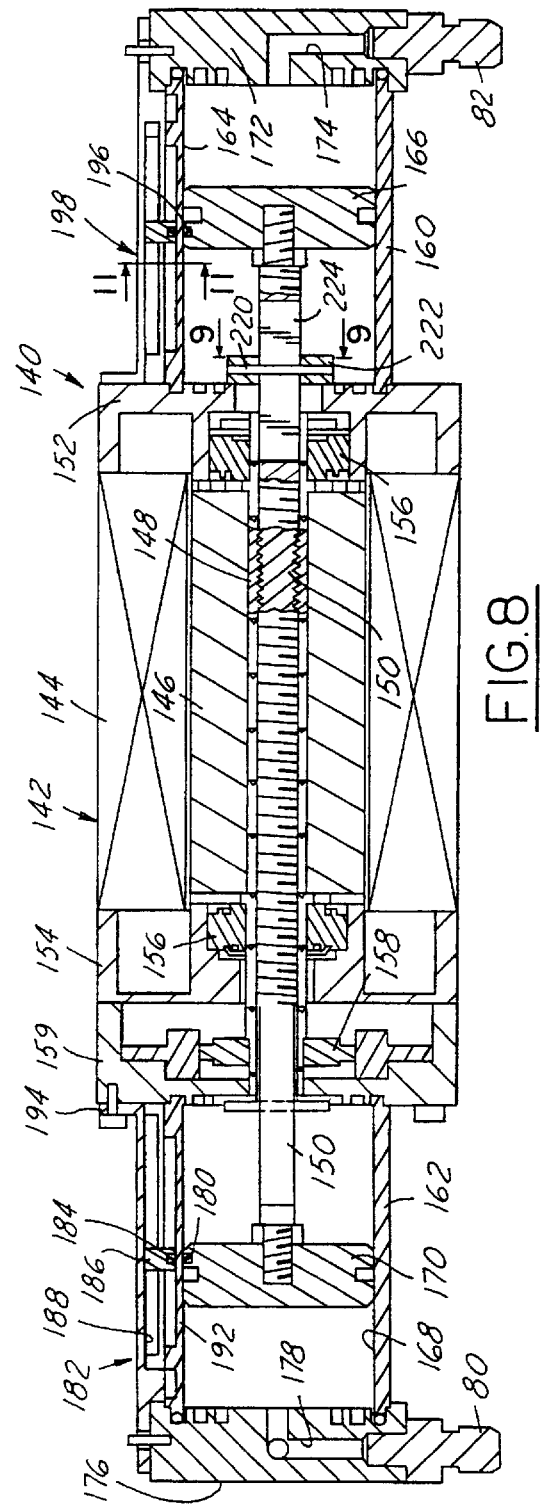

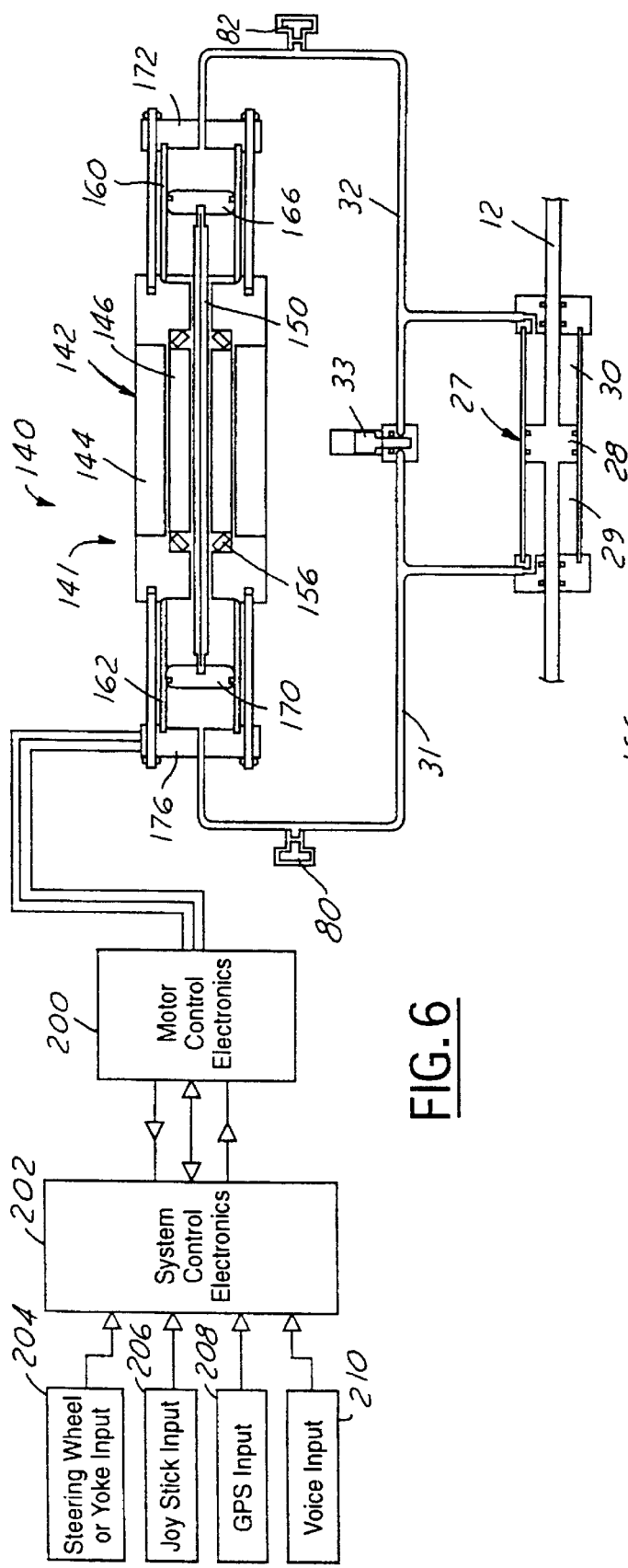
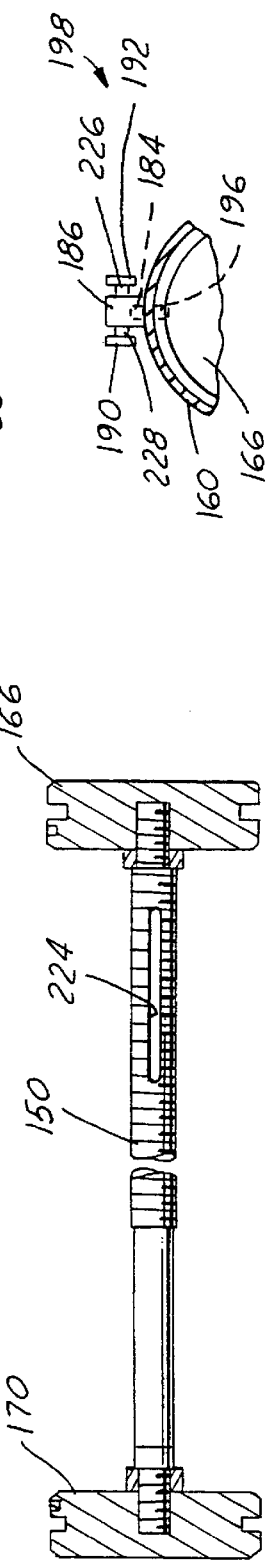
FIG. 6
FIG. 10
FIG. 11

PRECISION ELECTRO-HYDRAULIC ACTUATOR POSITIONING SYSTEM

This application claims priority from application PCT/US01/02624 filed Jan. 26, 2001, and is a continuation-in-part of application Ser. No. 09/492,623 filed Jan. 27, 2000, now U.S. Pat. No. 6,298,941, which claims priority from application Ser. No. 60/117,890 filed Jan. 29, 1999.

This invention relates to actuator positioning systems, and more particularly to an electro-hydraulic system for precisely positioning the output of a hydraulic actuator. In presently preferred embodiments of the invention, the invention relates yet more specifically to electro-hydraulic vehicle power steering systems that incorporate an electric/hydrostatic steering assist module.

BACKGROUND AND OBJECTS OF THE INVENTION

Typical power assisted steering systems in use today include a belt-driven high rpm rotary hydraulic pump, specifically engineered hoses, tubes, couplings, an array of brackets and fasteners, and a rack and pinion subassembly. All of these components are engineered to endure the rigors of extreme thermal cycling brought about by a combination of ambient temperatures in the engine compartment, and various operational loads handled by the steering pump under the usual driving conditions. Such power-assisted systems are a source of noise, operating inefficiency and leakage, and consume a large amount of engine power. Power assisted steering pumps are built to very exact tolerances. Many components of these pumps are fabricated under tightly controlled manufacturing processes in order to maintain design specifications. Small discrepancies in manufacturing processes can lead to many performance problems.

A general object of the present invention is to provide an electro-hydraulic system for positioning a hydraulic actuator that obtains improved accuracy at reduced cost. Another object of the present invention is to limit, if not entirely eliminate, many of the problems described above associated with conventional electro-hydraulic actuator positioning systems, including specifically power steering systems. Another object is to provide a power steering system which is composed of a relatively few parts, is rugged and durable in use, and is capable of being inexpensively manufactured and readily installed. A further object of the invention is to provide an electro-hydraulic steering assist module for automotive applications that eliminates any requirement for a conventional rotary-driven power steering fluid pump, which in turn eliminates a major source of fluid-borne noise and increases fuel economy. Another object of the invention is to provide a power steering assist module that employs a rack and pinion assembly that is currently in production, thereby eliminating any necessity for redesigning or requalifying the rack and pinion portion of the steering system.

SUMMARY OF THE INVENTION

An electro-hydraulic actuator system in accordance with a presently preferred embodiment of the invention includes a hydraulic actuator having a pair of fluid chambers and being operable to provide an actuator output as a function of fluid pressures at the chambers. An electric-hydrostatic actuator includes an electric motor responsive to motor control signals for providing an output to a motor shaft, one or more pistons coupled to the shaft, and one or more hydraulic cylinders mounted on the motor and cooperating with the pistons for providing a pair of fluid cylinders respectively coupled to the fluid chambers at the hydraulic actuator. A solenoid valve is connected between the chambers, and is responsive to valve control signals for feeding fluid between the actuator chambers and thereby short circuiting the hydrostatic actuator cylinders. A pair of pressure sensors are coupled to the actuator chambers for providing respective pressure signals as a function of fluid pressure at the chambers, and a controller is responsive to the pressure signals for providing the valve and motor control signals. The electro-hydraulic actuator system of the present invention is disclosed in conjunction with electro-hydraulic steering assist modules for automotive steering applications. However, the electro-hydraulic actuator system of the present invention may also be employed in conjunction with marine applications such as rudder and engine tilt controls, aerospace applications such as landing gear, cargo door and flight control surface controls, and industrial applications such as assembly line diverters and horizontal fork positioning controls on fork trucks.

The electric motor in accordance with the preferred embodiments of the invention comprises a rotary motor, and the motor output shaft comprises a leadscrew operatively coupled to the piston or pistons for moving the piston or pistons linearly in associated cylinders. In one disclosed embodiment of the invention, the leadscrew is a rotary leadscrew disposed in axially stationary position, and the piston or pistons are axially movable along the rotary leadscrew. In another disclosed embodiment of the invention, the leadscrew is non-rotatable and has external threads coupled to internal threads on a rotatable armature sleeve disposed within the motor, and a piston is mounted on one or both ends of the leadscrew. Rotation of the armature sleeve translates the leadscrew axially with respect to the motor and reciprocates the piston(s) within the associated cylinder(s). In one embodiment of the invention, a single piston is disposed within the cylinder of a housing mounted to the motor, and the fluid cylinders are formed on opposite sides of the piston. In another embodiment of the invention, housings are secured to the axial ends of the motor, and the leadscrew extends from the axial ends of the motor for coupling to pistons within the associated housings. The housing or housings preferably are formed by an extrusion that has a central chamber within which a piston is disposed, and at least one peripheral chamber that cooperates with passages in end caps for forming fluid passages to and from the fluid cylinders. The control electronics may be mounted in another peripheral chamber, and may include a magnetic sensor for monitoring position of the piston within its associated chamber through the extrusion wall that divides the chambers.

In the disclosed embodiments of the invention having particular utility in electro-hydraulic power steering assist applications, an elongated rack is adapted to be connected at opposite ends to steerable wheels on a vehicle. A rotatable steering gear is in mesh with a series of teeth along a section of the rack, and is adapted to be operatively connected to a steering wheel of a vehicle so as to receive vehicle operator steering input. The rack extends lengthwise within an elongated housing constructed to form a power assist cylinder. A piston is carried by the rack and separates the power assist cylinder into first and second power assist working fluid chambers that are respectively coupled to the fluid cylinders of the electric-hydrostatic actuator. The power assist steering system preferably is entirely self contained, requiring no fluid input from an external rotary pump or the like. The power steering rack and pinion arrangement may be of conventional design, eliminating any requirement for redesigning or requalifying this portion of the steering system. Control parameters such as steering "feel" may be readily configured by software in the control electronics.

BRIEF DESCRIPTION OF THE DRAWINGS

The invention, together with additional objects, features and advantages thereof, will be best understood from the following description, the appended claims and the accompanying drawings in which:

FIG. 4 is a sectional view of the electro-hydraulic steering assist module in FIGS. 1–3;

FIG. 6 is a schematic diagram of an electro-hydraulic steering assist module and system in accordance with another embodiment of the invention;

FIG. 8 is a sectional view of the steering assist module illustrated in FIGS. 6 and 7;

FIG. 10 is an elevational view of the leadscrew and piston subassembly in the module of FIGS. 6–8; and FIG. 11 is a fragmentary sectional view taken substantially along the line 11—11 in FIG. 8.

DETAILED DESCRIPTION OF THE PREFERRED EMBODIMENTS

Figure 1:
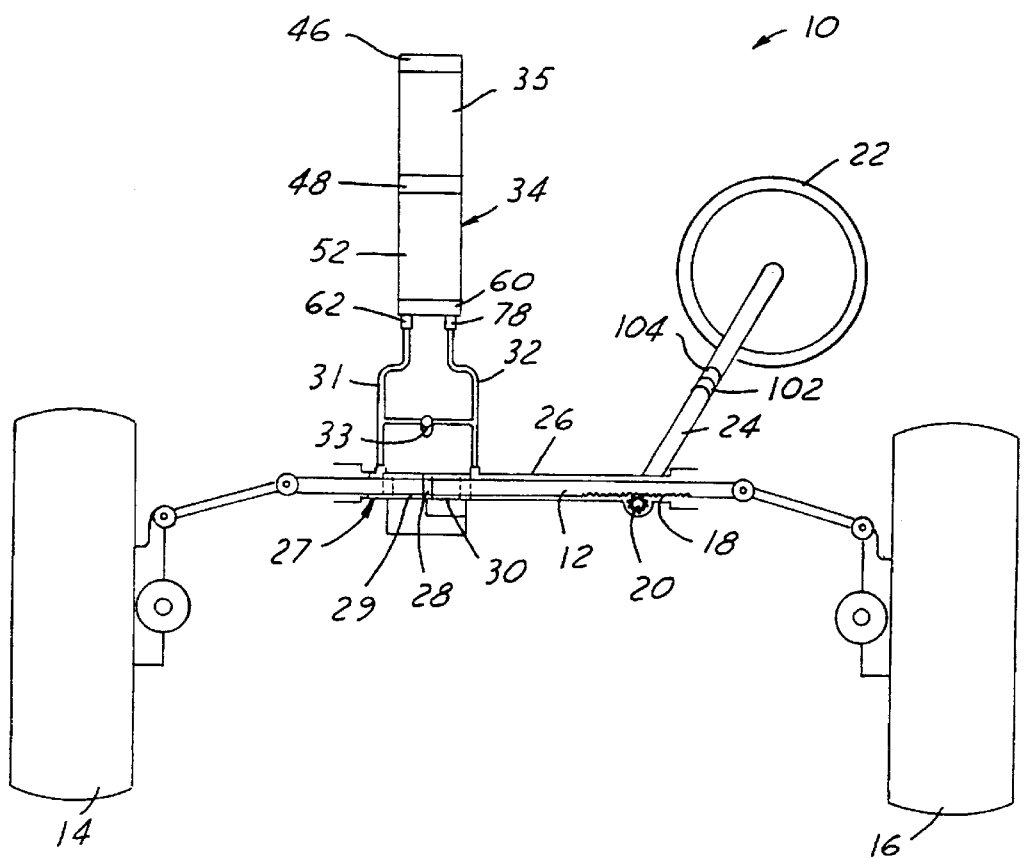
FIG. 1 is a schematic diagram of a vehicle electrohydraulic power steering system in connection with one presently preferred implementation of the invention.

Referring now more particularly to the drawings, FIG. 1 shows, in an exemplary first system embodiment 10 of the invention, an elongated rack 12 adapted to be connected at opposite ends to the steerable wheels 14, 16 of a motor vehicle. The rack has a series of teeth 18 along a section of its length. A rotatable pinion gear 20 in mesh with the rack teeth 18 is connected to a steering wheel 22 of the vehicle by a column 24 so as to receive operator steering input. (In many applications, there is an intermediate steering column or shaft connected to pinion gear 20 and shaft 24 by universal joints. This intermediate shaft is not illustrated in the schematic diagram of FIG. 1, and is not germane to the illustrated embodiments of the present invention.) Rack 12 extends lengthwise within an elongated housing 26, which is constructed to form an elongated power assist linear actuator cylinder 27 adjacent to one end. Spaced apart circular interior portions of reduced diameter define the ends of the cylinder and have a sealed engagement with the rack in order to close opposite ends of the cylinder. A piston 28 carried by the rack within cylinder 27 has a sealed engagement with the interior of the cylinder and separates the cylinder into cylinder chambers 29, 30 on opposite sides of the piston. Hydraulic fluid fills the chambers. A fluid line 31 communicates with one chamber 29 adjacent to one end of the actuator cylinder. A fluid line 32 communicates with the other chamber 30 adjacent to the opposite end of the cylinder. Fluid lines 31, 32 are connected to corresponding ports of a power assist module 34 in accordance with the present invention. A normally open solenoid valve 33 is connected between fluid lines 31, 32 for operation as will be described. In the absence of an electrical valve control signal, caused for example by an electrical control unit or power failure, valve 33 will open so as to short circuit module 34 and provide full manual (non-assisted) steering.

Figure 2:
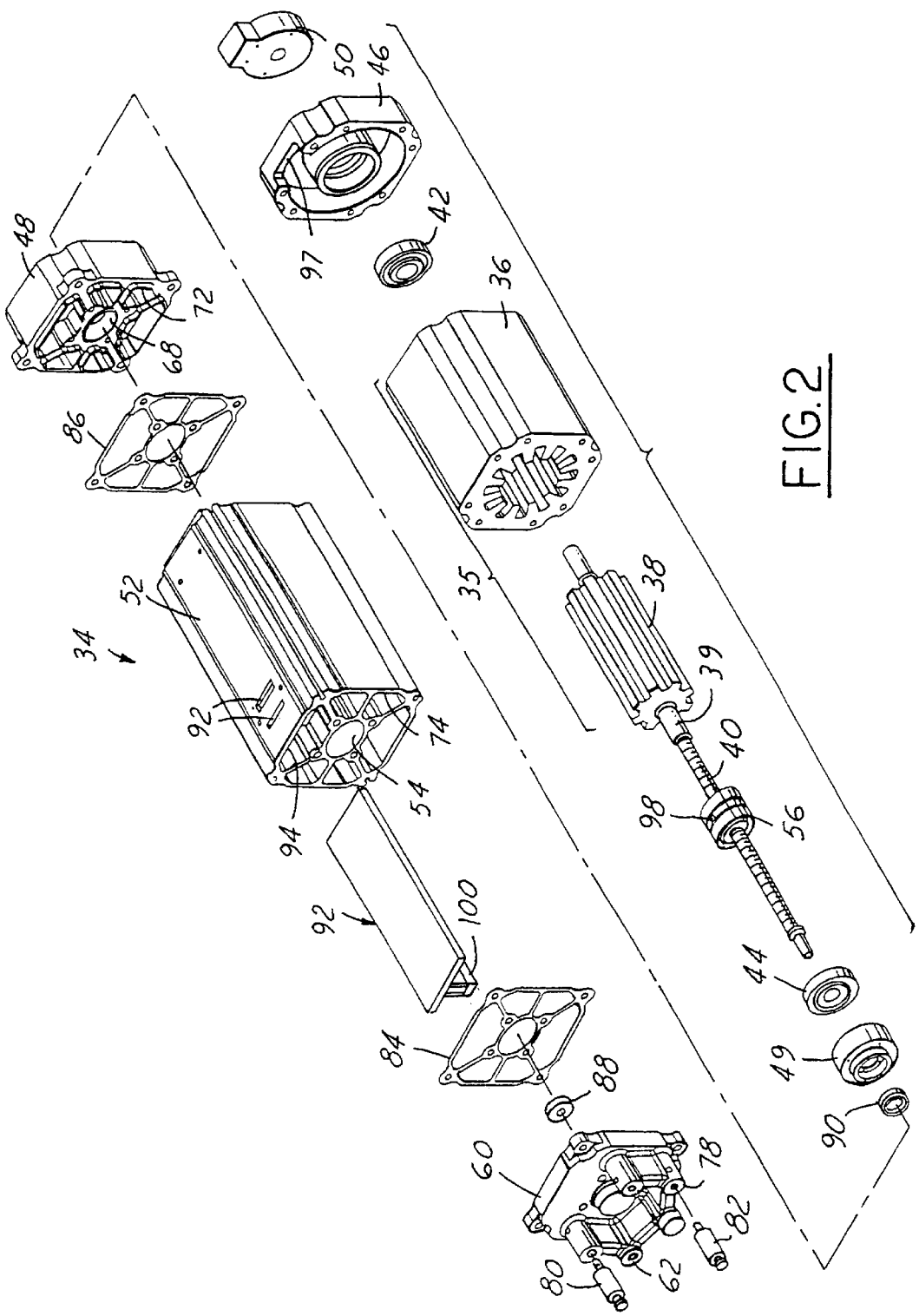
FIG. 2 is an exploded perspective view of the electrohydraulic steering assist module in the system of FIG. 1.
Figure 3:
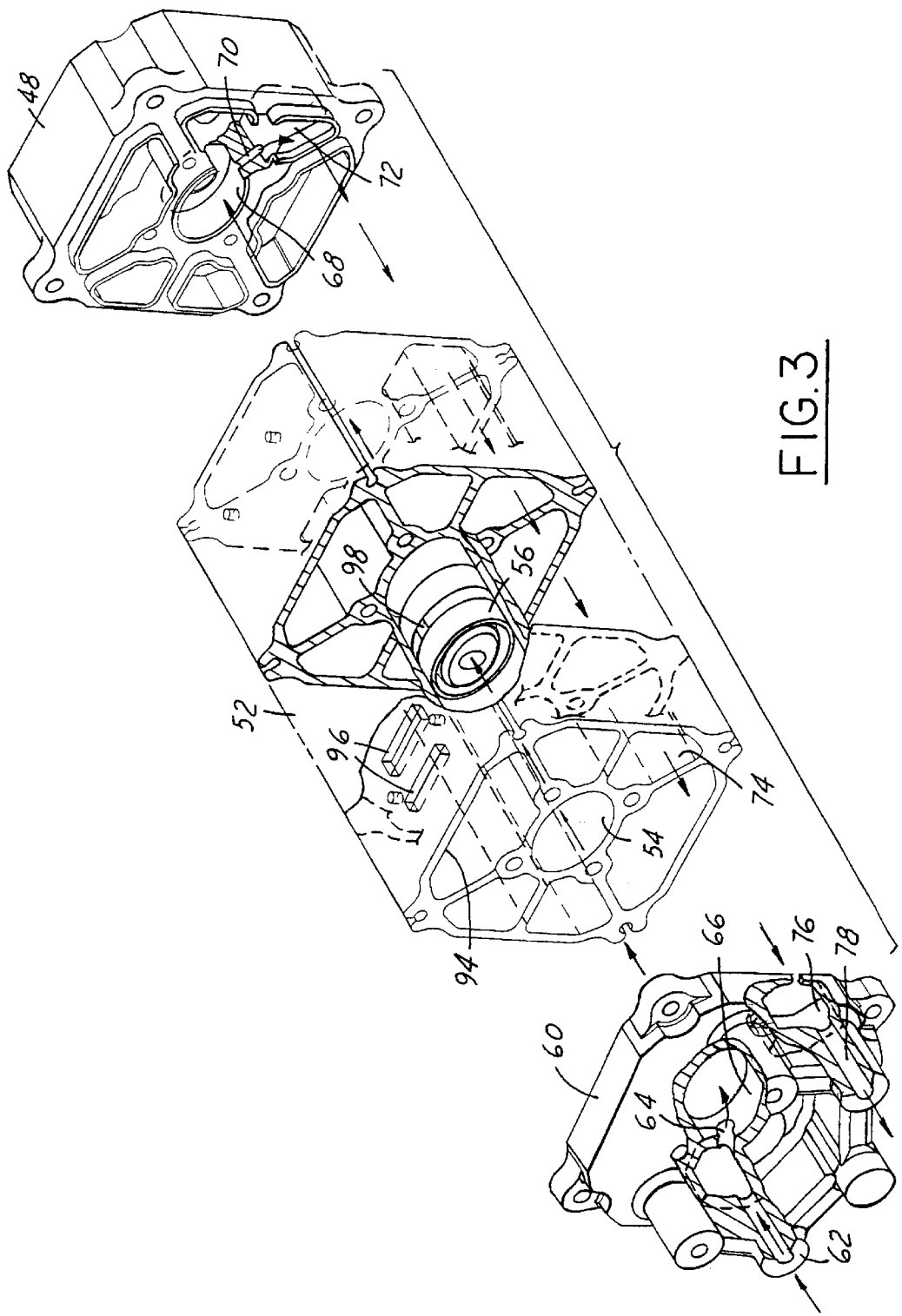
FIG. 3 is an exploded perspective view of a portion of FIG. 2.

FIGS. 2–4 illustrate power assist module 34 in greater detail. Module 34 includes an electric motor 35 having a stator 36 with associated stator windings, and a rotor 38 having associated radially extending poles. Motor 35 may be of any suitable type, including a switched reluctance motor, a brushless dc motor, a brushed dc motor and an ac motor. A switched reluctance motor is currently preferred. Rotor 38 in this embodiment is secured to a leadscrew 40 by a coupling 39 or other suitable means such that rotor 38 and leadscrew 40 rotate coaxially and in unison. The leadscrew is preferably press fitted and epoxied to the rotor. The rotor and leadscrew can alternatively be made as a single unit. Rotor 38 is supported at opposite axial ends by bearings 42, 44 carried by respective motor end bells 46, 48. Bearing 44 is mounted within a keeper 49. A resolver 50 or other suitable rotary position sensor is coupled to the end of rotor 38 within end bell 46 (or end bell 48) for providing to control electronics a signal indicative of rotary position of the rotor and leadscrew shaft. Sensorless commutation may also be employed utilizing the stator windings as a position sensor.

A housing 52 is mounted on end bell 48. Housing 52 preferably is in the form of an elongated extrusion, as best seen in FIGS. 2 and 3, having a central chamber 54 that is coaxial in assembly with and surrounds leadscrew 40, and a plurality of peripheral chambers surrounding the central chamber. Being an extrusion, the central chamber and peripheral chambers are of uniform geometry throughout the length of the extruded housing body. A piston 56 is slidably disposed within chamber 54 and has internal threads operatively coupled to the external threads of leadscrew 40. Thus, axial position of piston 56 with respect to leadscrew 40 is controlled by rotation of the leadscrew, which in turn is controlled by rotation of rotor 38 within stator 36. Chamber 54 and piston 56 are non-circular, preferably elliptical in lateral cross section so that piston 56 does not rotate within chamber 54 during rotation of leadscrew 40 and axial translation of piston 56 lengthwise of chamber 54. A port cap 60 is mounted on the end of extrusion housing 52 remote from end bell 48. Port cap 60 has a fluid port 62 connected by a cross passage 64 (FIG. 3) to a central internal pocket 66, which aligns in assembly with central chamber 54 of extrusion 52. The end of chamber 54 on the opposing side of piston 56 communicates with a central pocket 68 in end bell 48. Pocket 68 is connected by a cross passage 70 (FIG. 3) to a pocket 72 that is aligned in assembly with a peripheral extrusion passage 74. The opposing end of passage 74 aligns with a pocket 76 in port cap 60, which is connected to a fluid port 78. Thus, port 62 is in fluid communication with the working chamber formed on one side of piston 56 by means of cross passage 64, pocket 66 and chamber 54, and port 78 is in fluid communication with the working chamber on the opposing side of piston 56 by means of pocket 76, chamber 74, pocket 72, cross passage 70 and pocket 68.

In assembly of module 34 with steering system 10 (FIG. 1), fluid lines 31, 32 are connected to ports 62, 78 of port cap 60. A pair of pressure sensors 80, 82 are secured on port cap 60 in fluid communication with the opposing sides of piston 56 in extrusion 52. These pressure sensors 80, 82 provided electrical pressure signals as a function of fluid pressure within fluid lines 31, 32 (FIG. 1). Fluid pressure in these lines varies not only as a function of position of piston 56 within extrusion 52, but also as a function of position of rack 12 under control of steering wheel 22. A pair of gaskets 84, 86 are mounted between port cap 60 and end bell 48 and the opposing ends of extrusion 52. A shaft seal 88 is mounted on the end of leadscrew 40 within port cap 60, and a second shaft seal 90 surrounds armature 38 within end bell 48. An electronic controller 92 is disposed within a peripheral chamber 94 in extrusion 52. A pair of openings 96 in one outside wall of extrusion 52 provide for electrical connection to electronic controller 92 from outside module 34. An opening 97 in end bell 46 provides for electrical connection to the windings of motor 35, as best seen in FIG. 4. Piston 56 carries a magnetic 98 adjacent to the wall 99 of chamber 54 that separates chamber 54 from chamber 94. Electronic controller 92 includes a magnetic position sensor 100 disposed in assembly adjacent to wall 99. Sensor 100 carries Hall effect or other sensor elements responsive to magnetic energy from magnet 98 on piston 56 for sensing the axial position of piston 56 along chamber 54 of extrusion 52. Inasmuch as piston 56 is non-rotatably mounted within chamber 54, magnetic 98 is continuously positioned adjacent to sensor 100. The mating threads of leadscrew 40 and piston 56 are engineered and fabricated to provide smooth low friction operation with minimal leakage between the opposed fluid chambers. However, a small controlled leakage of fluid between the leadscrew and the piston may be desirable because the fluid would act as a lubricant between the leadscrew and the piston. A boundary layer of fluid would also aid in limiting backlash typically associated with threaded components.

A steering wheel position sensor 102 is operatively coupled to steering wheel column 24 (FIG. 1) for providing an electrical signal indicative of absolute position of the steering wheel. This steering wheel position sensor may be monitored to provide the following steering wheel information: (a) the angular displacement in degrees (left or right) from a center position, which is defined as the point where the steerable wheels are straight ahead; (b) the rate at which the steering wheel is being turned (measured in degrees per second, for example). The steering wheel position information from sensor 102 may be analyzed by controller 92 and used for: (a) initialization and positioning of piston 48 in the steering assist module at the time of vehicle start-up. (b) all steering maneuvers. The steering wheel position information may be used to calculate the required rpm of electric motor 35 for steering assist operations. Steering wheel position sensor 102 may be of any suitable type, such as an optical disk and associated sensors.

A torque sensor 104 (FIG. 1) is also coupled to steering column 24. During vehicle operation, a measurable amount of torque is applied to steering column 24, either by the vehicle operator through steering wheel 22 or in reaction to road forces reflected back through the steering gear of the vehicle into the system. This torque value reflected in steering column 24 is affected by a number of factors including: (a) the coefficient of friction between the vehicle tires and the driving or road surface. This coefficient of friction in turn is affected by: (1) vehicle weight, (2) vehicle speed, and (3) driving surface conditions (e.g., dry pavement, surface temperature, gravel, sand, water, ice); (b) friction between components of the mechanical steering system: (1) articulating joints (e.g., steering column universals, bearings, tie-rod ends, balljoint); (2) mating gear surfaces; (3) lubrication and contamination seals; (c) continued application of force to steering wheel after: (1) design travel limits of steering system have been met (i.e., full turn left or right); (2) contact with an external obstruction (e.g., a curb or a rut in the driving surface); (d) continued application of steering force to offset external forces: (1) constant radius turns (e.g., ramp onto freeway); (2) driving surfaces that pitched perpendicular to direction of travel (e.g., a crowned road). Data obtained from torque sensor 104 can be used in conjunction with data taken from pressure sensors 80, 82, and integrated to determine and control the magnitude of the torque output of motor 35 to be applied to develop the hydraulic fluid pressure to assist vehicle steering operations. This data can also be used to differentiate between operator input and road induced phenomena through suitable software systems in controller 92.

Figure 5:
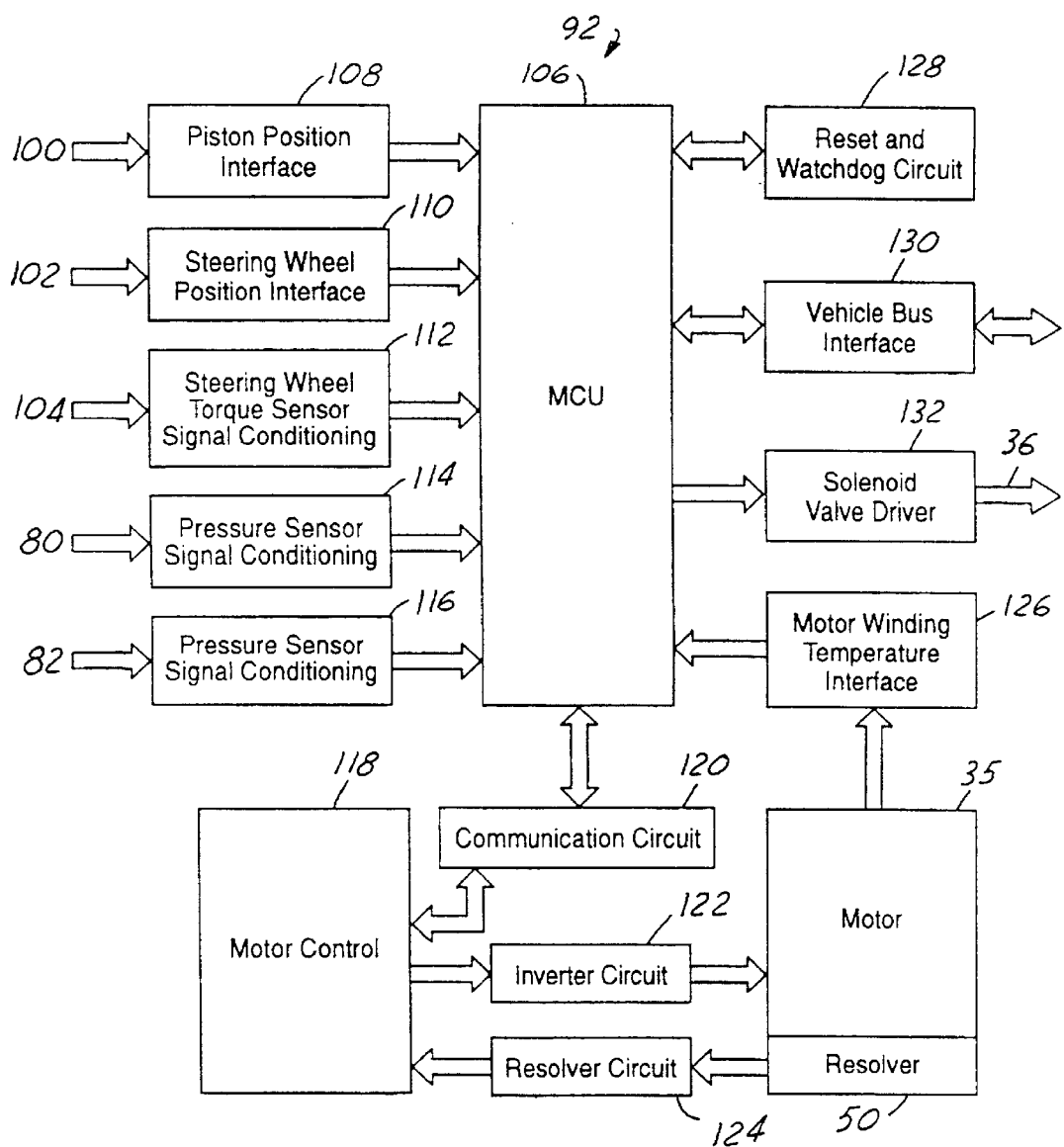
FIG. 5 is an electronic functional block diagram of the control unit in the steering assist module of FIGS. 1–4.

FIG. 5 is a functional block diagram of electronic controller 92. Controller 92 includes a microprocessor-based motor control unit 106. Unit 106 receives an input from piston position sensor 100 through an associated interface circuit 108, an input from steering column position sensor 102 through an associated interface circuit 110, an input from steering column torque sensor 104 through an associated signal conditioning circuit 112, and signals from pressure sensors 80, 82 through associated signal conditioning circuits 114, 116. A motor control circuit 118 is connected to control unit 106 through a communication interface 120, and is connected to motor 35 through an inverter circuit 122. Motor control circuit 118 receives position feedback information from resolver 50 through a resolver signal conditioning circuit 124 for closed loop servo control of motor rotation. Motor 35 also provides input to motor control unit 18 indicative of motor winding temperature through an associated interface circuit 126. Motor control unit 106 is connected to a reset and watchdog timer 128 for monitoring continued operation of the motor control unit, and is connected to other control units on the vehicle through an interface 130. Motor control unit 106 can obtain information indicative of vehicle on/off status and vehicle speed through interface 130. Control unit 106 provides a valve control signal output to solenoid valve 36 (FIG. 1) through a solenoid valve driver 132. Controller 92 is powered by the dc power system of the vehicle through suitable voltage regulation. In the embodiment illustrated in FIG. 1, rack 12 is directly coupled to steering column 24, so steering column position sensor 102 provides an indication of rack position. In other applications, a position sensor may be coupled to rack 12 for providing a direct indication of absolute rack position.

In operation, the vehicle operator provides a steering input to rack 12 (FIG. 1) by means of steering wheel 22, steering column 24 and pinion gear 20. Motion of the rack, and consequent motion of piston 30 within cylinder 28, creates a pressure differential at lines 31, 32, which is sensed by pressure sensors 80, 82. Electronic controller 92 receives these pressure signals, and provides a control signal to motor 35 so as to command rotation of leadscrew 40 and motion of piston 56 within chamber 54 to minimize this pressure differential between the two sensors. This electromotively developed motion of piston 56, and the consequent hydraulically-developed fluid flow forces, provide the power to assist the vehicle operator in manually applying torque through steering column 24 to achieve the desired motion at rack 12 and move steerable wheels 14, 16. When the vehicle is operated at relatively low speed, it is important that the power steering assist system be effective. Normally open solenoid valve 33 is closed by a valve control signal from control unit 106, and assist module 34 is fully effective. However, at higher speeds, power assist is normally not needed. Under such circumstances, a vehicle speed sensor will provide appropriate input to motor control unit 106 through vehicle bus interface 130, whereupon control unit 106 will de-energize solenoid valve 33, opening the valve and disabling the power assistance. In an emergency situation, such as when the operator of the vehicle makes a sudden lane change, a first indication of the steering maneuver is provided by steering column torque sensor 104. There is also a momentary increase in fluid pressure will be sensed by pressure sensors 80, 82, sending a signal to the controller to energize solenoid valve 33 to close the valve and allow power assistance. It is to be noted that use of a normally-open solenoid valve 33 allows the rack and pinion steering arrangement to be effective, without power assistance, in the event of electrical power failure at the vehicle or failure at the power assistance electrical control unit.

Figure 9:
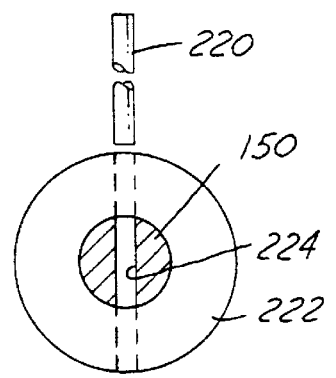
FIG. 9 is a sectional view taken substantially along the line 9—9 in FIG. 8.
Figure 7:
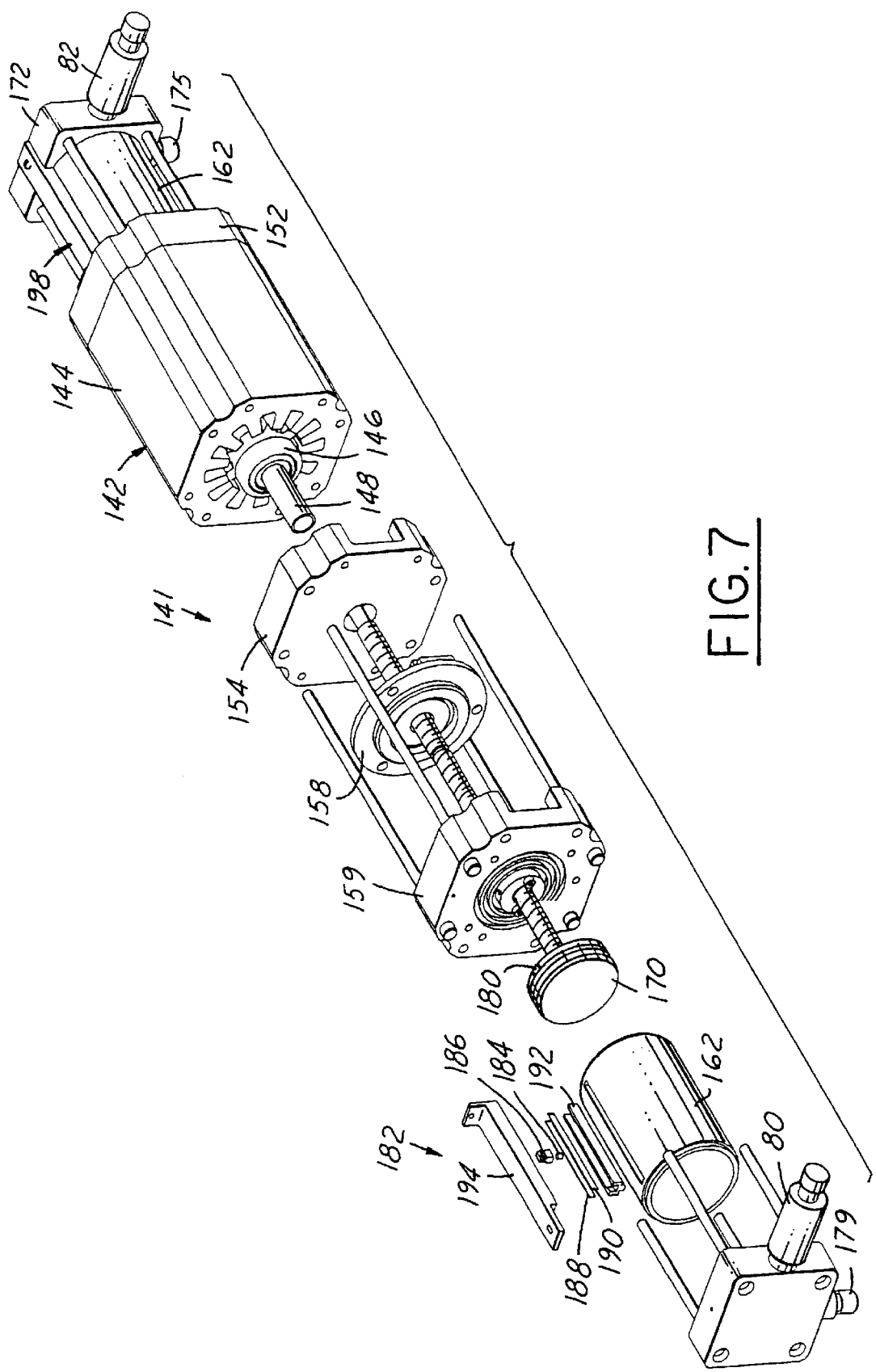
FIG. 7 is an exploded perspective view of the steering assist module illustrated in FIG. 6.

FIGS. 6–8 illustrate a second embodiment 140 of the present invention. Reference numerals that are identical to those used in the embodiment of FIGS. 1–5 indicate identical or functionally related parts. A power assist module 141 includes an electric motor 142 having a stator 144 and a rotatable armature 146. A sleeve 148 (FIG. 8) is press fitted or otherwise secured within armature 146 so as to rotate conjointly with the armature within stator 144. Sleeve 148 has internal threads mated with external threads on a leadscrew 150. Leadscrew 150 extends from both axial ends of motor 142. Armature 146 is rotatably mounted between a pair of end bells 152, 154 by means of bearings 156 rotatably supporting axially opposed ends of sleeve 148. A resolver or other suitable rotary position sensor 158 is mounted within a cap 159 secured to end bell 156 and operatively coupled to sleeve 148 for detecting rotary position of the sleeve. A pair of end housings 160, 162 are mounted on end bells 152, 154 respectively externally coaxially surrounding the opposed ends of leadscrew 150. Housing 160 has an internal chamber 164, within which is disposed a piston 166 operatively coupled to the associated end of leadscrew 150. Likewise, housing 162 has an internal chamber 168, within which is disposed a piston 170 operatively coupled to the associated opposite end of leadscrew 150. Thus, rotation at armature 146 and sleeve 148 results in axial translation of leadscrew 150 and pistons 166, 170 within their associated chambers 164, 168. The subassembly of pistons 166, 170 and leadscrew 150 is prevented from rotating with sleeve 148 by means of a pin 220 (FIGS. 8 and 9) extending through an anti rotation collar 220 secured to end bell 152, and an elongated slot 224 (FIGS. 8–10) in leadscrew 150.

The axially outer end of housing 160 terminates in a port cap 172 having a fluid passage 174 for connection to fluid line 31 or 32 (FIG. 1) through a fitting 175 (FIG. 7). Likewise, housing 162 has a port cap 176 with a fluid passage 178 for connection to the other fluid line 31 or 32 (FIG. 1) through a fitting 179. Fluid pressure sensors 80, 82 are also mounted on the port caps and connected to fluid passages 178, 174 respectively. Piston 170 has a magnet 180 at its periphery adjacent to the internal wall of chamber 168. A magnetic position sensor, generally indicated at 182, is externally mounted on housing 162 for tracking position of piston 170 within chamber 168. Sensor 182 includes a magnet 184 disposed within a non-magnetic keeper 186. Keeper 186 is slidably longitudinally captured between a pair of sensor strips 188, 190. Keeper 186 has a pair of laterally extending wipers 226, 228 that slidably engage strips 188, 190 respectively. Strips 188, 190 comprise variable resistance strips that provide electrical output signals indicative of position of keeper 186 and magnet 184 between the strips. Strips 188, 190 are captured within a U-shaped housing 192, and a cover 194 is positioned over housing 192 to form sensor assembly 182. Cover 194 is secured to port cap 176 and end bell cap 159, as best seen in FIG. 8. Piston 166 carries a magnet 196, and a piston position sensor 198 identical to sensor 182 is mounted to housing 160 (FIGS. 7 and 8). Sensors 182, 198 are connected to motor control electronics 200 and system control electronics 202 (FIG. 6), as are motor stator 144, pressure sensors 80, 82 and solenoid valve 33.

In operation, the embodiment of FIGS. 6–9 functions in a manner similar to that of the embodiment of FIGS. 1–5. Operator steering input to rack 12 produces a pressure differential between pressure sensors 80, 82. This pressure differential is sensed by the control electronics, which provide input to motor 142 for moving pistons 166, 170 conjointly in a direction to reduce such pressure differential. This piston movement assists the operator steering input to the steering system, as in the prior embodiment. FIG. 6 also illustrates that the electro-hydraulic actuator system in accordance with the present invention may receive external control input not only from a steering wheel or yoke 204 associated with a vehicle steering system, but also from a joystick 206, a geographic positioning system 208 and/or a voice input command module 210.

As indicated previously, the electronic control unit may be connected through vehicle bus interface 130 (FIG. 5) to as conventional multiplexed vehicle information network. On/off vehicle input information and vehicle speed information may be obtained from the vehicle information network. There may be a bidirectional exchange of system data over the vehicle network, so that the system control electronics may share with a conventional vehicle onboard electronic control unit the power steering system status, pressure data, actuator sensor data, etc. System performance can then be monitored by suitable software, system diagnostics can be analyzed by suitable software, and system performance can be enhanced by changes in such software. Both illustrated embodiments of the invention show use in a power-assisted vehicle steering system, in which the hydraulic actuator is double-ended and integrated with an otherwise conventional rack and pinion steering arrangement for connection to opposed steerable vehicle wheels. However, the hydraulic actuator could be single-ended or a rotary-type actuator without departing from the principles of the invention in their broadest aspects.

There has thus been disclosed an electro-hydraulic actuator system that fully satisfies all of the objects and aims previously set forth. The invention has been disclosed in conjunction with electro-hydraulic power-assisted vehicle steering systems, but finds ready application in other system applications as described. As applied specifically to power steering systems, elimination of the conventional rotary pump removes a major source of fluid-borne noise and improves fuel economy on the order of four to seven percent. A number of modifications and variations have been discussed. Other modifications and variations will readily suggest themselves to persons of ordinary skill in the art in view of the foregoing description. The invention is intended to embrace all such modifications and variations as fall within the spirit and broad scope of the appended claims.

What is claimed is:

1. An electro-hydraulic actuator system that comprises:
   a hydraulic actuator having a pair of fluid chambers and being operable to provide an actuator output as a function of fluid pressures in said chambers,
   an electric-hydrostatic actuator including an electric motor responsive to motor control signals for providing output at a motor shaft, piston means coupled to said shaft, and hydraulic cylinder means mounted on said motor and cooperable with said piston means for providing a pair of pump fluid cylinders respectfully coupled to said fluid chambers of said hydraulic actuator, a solenoid valve connected between said actuator chambers and responsive to valve control signals for feeding fluid between said chambers short circuiting said cylinders, a pair of pressure sensors coupled to said chambers for providing respective pressure signals as functions of fluid pressure in said chambers, and control means responsive to said pressure signals for providing said valve control signals and said motor control signals.

2. The system set forth in claim 1 wherein said electric motor comprises a rotary motor, and wherein said motor shaft comprises a leadscrew operatively coupled to said piston means for moving said piston means linearly in said cylinders as a function of rotary output of said motor.

3. The system set forth in claim 2 wherein said leadscrew comprises a rotary leadscrew disposed in stationary position, and wherein said piston means is axially movable along said rotary leadscrew.

4. The system set forth in claim 2 wherein said motor includes a rotatable sleeve having an internal thread, wherein said leadscrew is axially movable as a function of rotary position of said sleeve, and wherein said piston means is secured to an end of said leadscrew.

5. The system set forth in claim 4 wherein said leadscrew is secured against rotation within said hydrostatic actuator.

6. The system set forth in claim 2 wherein said piston means is mounted against rotation within said cylinder means.

7. The system set forth in claim 6 further comprising a position sensor coupled to said piston means, and including a magnet carried by said piston means and a magnetic position sensor operatively magnetically coupled to said piston means through a wall of said cylinder means.

8. The system set forth in claim 2 wherein said cylinder means comprises a housing mounted on an end of said motor with said leadscrew extending into said housing, and a piston coupled to said leadscrew and slidably disposed in said housing.

9. The system set forth in claim 8 wherein said housing comprises an extrusion having multiple internal chambers extending through said extrusion, said piston being disposed in one of said chambers and other of said clambers comprising at least one fluid passage to said one chamber.

10. The system set forth in claim 9 wherein said extrusion has a central chamber in which said piston is slidably disposed and at least one peripheral chamber, and wherein said housing further comprises at least one end member mounted on said extrusion having at least one fluid port and internal passage means connecting said at least one port to at least one of said chambers.

11. The system set forth in claim 10 wherein said control means is disposed in one of said peripheral chambers.

12. The system set forth in claim 11 wherein said control means includes a sensor for monitoring position of said piston in said central chamber.

13. The system set forth in claim 12 wherein said piston includes a magnet, and wherein said sensor includes means for magnetic coupling to said piston through a wall of said extrusion that separates said one peripheral chamber from said central chamber.

14. The system set forth in claim 13 wherein said central chamber and said piston are non-round in lateral cross section.

15. The system set forth in claim 8 wherein said housing has a pair of fluid ports coupled to opposed sides of said piston.

16. The system set forth in claim 8 wherein said cylinder means comprises a housing mounted at each end of said motor with said leadscrew extending into each said housing, a piston in each said housing coupled to an end of said leadscrew, and a fluid port at each said housing coupled to one side of the associated piston.

17. The system set forth in claim 2 wherein said hydraulic actuator comprises: an elongated rack adapted to be connected at opposite ends to steerable wheels of a vehicle, said rack having a series of teeth along a section of its length, a rotatable pinion in mesh with the rack teeth and adapted to be operably connected by a column to a steering wheel of the vehicle so as to receive vehicle operator steering input, said rack extending lengthwise within an elongated housing constructed to form an elongated power cylinder and having thereon spaced apart first and second circular interior portions of reduced diameter defining the axially opposite ends of said power cylinder and having a sealed engagement with the rack in order to close opposite ends of said power cylinder, and a piston carried by said rack within said power cylinder having a sealed engagement with the interior of the cylinder and separating the cylinder into first and second power assist working chambers filled with hydraulic fluid.

18. A power steering apparatus comprising:

a hydraulic actuator having a pair of power assist cylinder chambers and operable to generate assisting power, a hydrostatic actuator for supplying pressurized fluid to said power assist chambers, an electric motor for operating said hydrostatic actuator, a control valve mechanism operable by a system controller for bypassing between said pair of power assist cylinder chambers of said hydraulic actuator the pressurized fluid supplied by said hydrostatic actuator, pressure sensors for detecting differential pressure between pressures in said pair of power assist cylinder chambers, and a motor control responsive to the output of said pressure sensors for controlling said electric motor thereby to cause said motor to drive said hydrostatic actuator in accordance with steering wheel position so as to return the differential pressure to a predetermined first value, said hydrostatic actuator comprising a double-acting actuator piston and cylinder unit having a pair of working chambers separated by said actuator piston and respectively communicating with said pair of power assist cylinder chambers, said electric motor being operable bidirectionally axially to drive a leadscrew on which said piston is mounted for travel in response to axial motion of said leadscrew.

19. An electro-hydraulic power steering system that comprises:

an elongated rack adapted to be connected at opposite ends to steerable wheels of a motor vehicle, said rack having a series of teeth along a section of its length, a rotatable steering gear in mesh with the rack teeth and adapted to be operably connected to a steering wheel of the vehicle by a shaft so as to receive vehicle operator steering input, said rack extending lengthwise within an elongated housing constructed to form an elongated power assist cylinder, a piston carried by said rack and separating said power assist cylinder into first and second power assist working chambers filled with hydraulic fluid, an electric-hydrostatic actuator including an electric motor responsive to motor control signals for providing an output to a motor shaft, piston means coupled to said shaft, and hydraulic cylinder means mounted on said motor and cooperating with said piston means for providing a pair of pump fluid cylinders respectively coupled to first and second power assist working chambers, a solenoid valve connected between said chambers and responsive to valve control signals for feeding fluid between said chambers, a pair of pressure sensors coupled to said power assist working chambers for providing respective pressure signals as a function of fluid pressure in said chambers, which in turn are responsive at least in part to steering input through said shaft, and control means responsive to said pressure signals for providing said valve control signal and said motor control signal.

20. The system set forth in claim 19 wherein said electric motor comprises a rotary motor, and wherein said motor shaft comprises a leadscrew operatively coupled to said piston means for moving said piston means linearly in said cylinders as a function of rotary output of said motor.

21. The system set forth in claim 20 wherein said leadscrew comprises a rotary leadscrew disposed in stationary position, and wherein said piston means is axially movable along said rotary leadscrew.

22. The system set forth in claim 20 wherein said motor includes a rotatable sleeve having an internal thread, wherein said leadscrew is axially movable as a function of rotary position of said sleeve, and wherein said piston means is secured to an end of said leadscrew.

23. The system set forth in claim 20 wherein said cylinder means comprises a housing mounted on an end of said motor with said leadscrew extending into said housing; and a piston coupled to said leadscrew and slidably disposed in said housing.

24. The system set forth in claim 23 wherein said housing comprises an extrusion having multiple internal chambers extending through said extrusion, said piston being disposed in one of said chambers and other of said clambers comprising at least one fluid line to said one chamber.

25. The system set forth in claim 24 wherein said extrusion has a central chamber in said piston is slidably disposed and at least one peripheral chamber, and wherein said housing further comprises at least one end member mounted on said extrusion having at least one fluid port and internal passage means connecting said at least one port to at east one of said chambers.

26. The system set forth in claim 25 wherein said control means is disposed in one of said peripheral chambers.

27. The system set forth in claim 26 wherein said control means includes a sensor for monitoring position of said piston in said central chamber.

28. The system set forth in claim 27 wherein said piston includes a magnet, and wherein said sensor includes means for magnetic coupling to said piston through a wall of said extrusion that separates said one peripheral chamber from said central chamber.

29. The system set forth in claim 28 wherein said central chamber and said piston are non-round in lateral cross section.

30. The system set forth in claim 23 wherein said housing has a pair of fluid ports coupled to opposed sides of said piston.

31. The system set forth in claim 23 wherein said cylinder means comprises a housing mounted at each end of said motor with said leadscrew extending into each said housing, a piston in each said housing coupled to an end of said leadscrew, and a fluid port at each said housing coupled to one side of the associated piston.

* * * * *